United States Patent
Nevermann

(10) Patent No.: US 6,921,170 B1
(45) Date of Patent: Jul. 26, 2005

(54) SMALL APPARATUS FOR PROCESSING COMMUNICATIONS AND/OR DATA, SAID APPARATUS COMPRISING A PROJECTOR

(75) Inventor: Peter Nevermann, San Diego, CA (US)

(73) Assignee: Siemens Aktiengesellschaft, Munich (DE)

( * ) Notice: Subject to any disclaimer, the term of this patent is extended or adjusted under 35 U.S.C. 154(b) by 678 days.

(21) Appl. No.: 10/069,279

(22) PCT Filed: Aug. 23, 2000

(86) PCT No.: PCT/DE00/02871

§ 371 (c)(1),
(2), (4) Date: Feb. 25, 2002

(87) PCT Pub. No.: WO01/16676

PCT Pub. Date: Mar. 8, 2001

(30) Foreign Application Priority Data

Aug. 27, 1999 (DE) .......................................... 199 40 757

(51) Int. Cl.⁷ ......................... G03B 21/26; G03B 21/00; G03B 29/00; H04N 7/14
(52) U.S. Cl. ........................ 353/28; 353/122; 353/43; 455/566; 348/14.02; 348/14.01
(58) Field of Search ............................. 353/11–14, 21, 353/28, 43, 37, 98, 99, 122; 349/5, 6, 7, 11, 16, 17, 69, 70; 348/14.01, 14.02, 14.03, 14.07, 744–747; 455/556.1, 557, 566, 90.2

(56) References Cited

U.S. PATENT DOCUMENTS

| | | | |
|---|---|---|---|
| 3,975,080 A | | 8/1976 | Norman |
| 5,032,924 A | * | 7/1991 | Brown et al. ................ 348/759 |
| 5,892,971 A | * | 4/1999 | Danielson et al. ............. 710/7 |
| 5,970,418 A | * | 10/1999 | Budd et al. .................. 455/566 |
| 6,310,662 B1 | * | 10/2001 | Sunakawa et al. .......... 348/747 |
| 6,323,892 B1 | * | 11/2001 | Mihara .................... 348/14.01 |
| 6,489,934 B1 | * | 12/2002 | Klausner .................... 345/1.1 |

FOREIGN PATENT DOCUMENTS

| | | |
|---|---|---|
| DE | 196 22 314 A1 | 12/1997 |
| DE | 197 26 860 C1 | 1/1999 |
| DE | 197 30 565 A1 | 2/1999 |
| EP | 0 782 307 A2 | 7/1997 |
| EP | 0 818 764 A1 | 1/1998 |
| EP | 0 888 005 A2 | 12/1998 |

* cited by examiner

*Primary Examiner*—Judy Nguyen
*Assistant Examiner*—Andrew Sever
(74) *Attorney, Agent, or Firm*—Bell Boyd & Lloyd LLC

(57) ABSTRACT

A small-scale communication and/or data processing apparatus with an indicating device, integrated in the apparatus, which has an image projector.

19 Claims, 3 Drawing Sheets

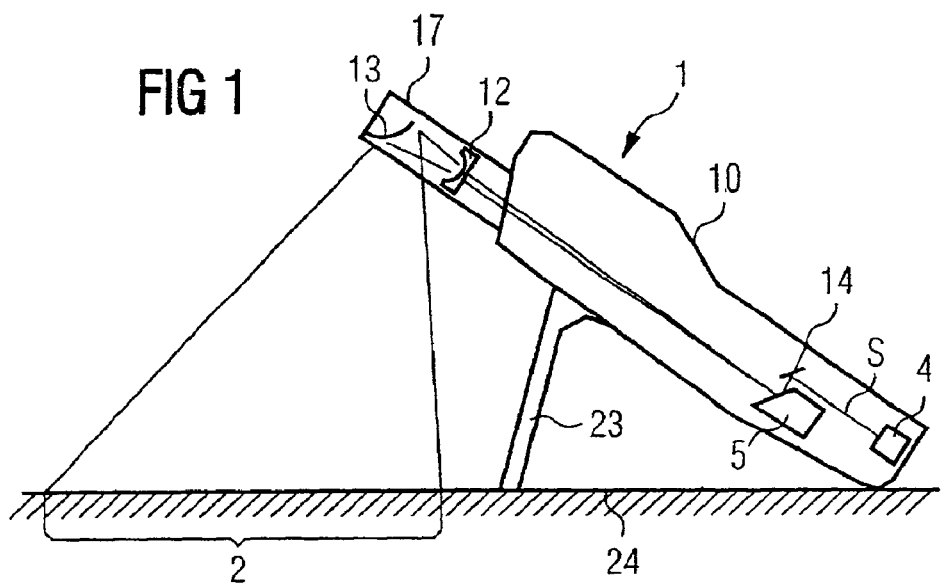
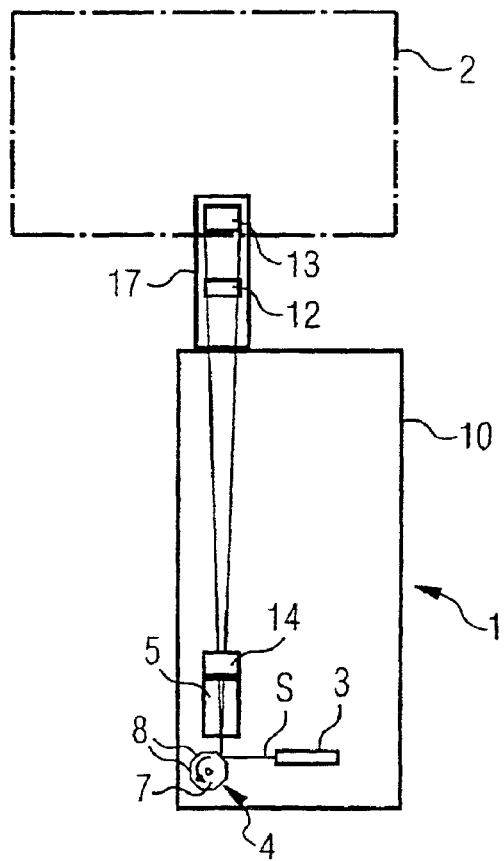

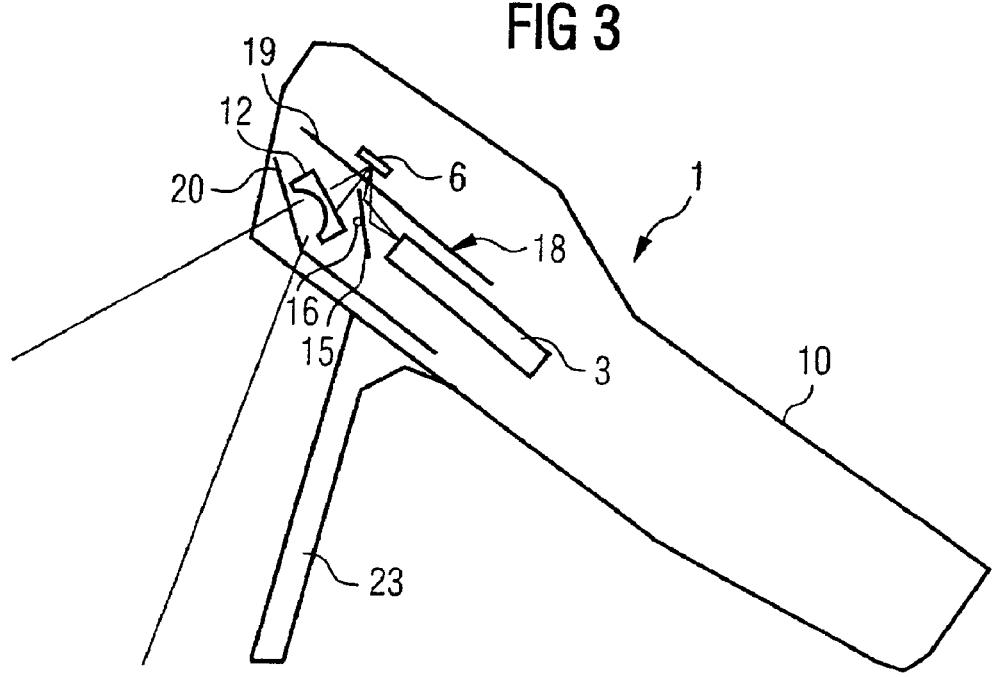
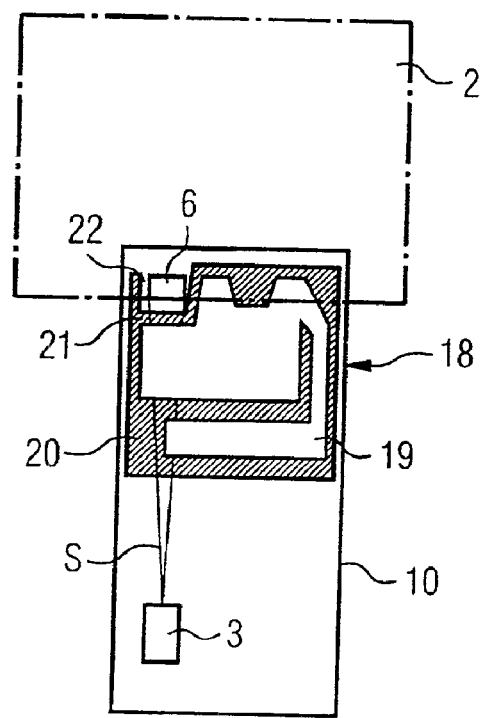

SMALL APPARATUS FOR PROCESSING COMMUNICATIONS AND/OR DATA, SAID APPARATUS COMPRISING A PROJECTOR

This application is a 371 of PCT/DE00/02871 filed Aug. 23, 2000.

BACKGROUND OF THE INVENTION

The present invention relates to a small-scale communication and/or data processing apparatus with an indicating device integrated in the apparatus.

The term small-scale communication and/or data processing apparatus is understood below as mobile telephones, cordless telephones, PDAs, organizers, palmtops or the like whose size is such that they can be held in one hand when being operated. However, this also can encompass relatively small apparatuses which are not taken along as mobile apparatuses, but are permanently installed; for example, relatively small table telephones.

Such small-scale apparatuses frequently have an indicating device in the form of an integrated display on which the information to be indicated by the apparatus is represented. Moreover, this display usually serves to control the apparatus. There are two conflicting requirements for all these small-scale electronic apparatuses that communicate with a user via a display. On the one hand, the apparatus itself is to be as small as possible, while on the other hand the indicating element, that is to say the display, is to be as large as possible. However, there is a mandatory limit in the case of the displays previously used, in that the indicating surface cannot be larger than the surface of the apparatus.

In order to circumvent this problem, many apparatuses use interfaces with the aid of which the apparatus can be connected to a stationary indicating apparatus; for example, a display screen. This has the disadvantage, on the one hand, that the advantage of mobility is lost when such a display screen is used, while on the other hand the appropriate display screen is not available at every site. In the case of stationary small-scale apparatuses, an external display screen increases the overall space requirement of the apparatus, including the indicating system. Thus, instead of a small-scale apparatus, use could be made here of a larger apparatus with a correspondingly large display.

It is an object of the present invention, therefore, to create an alternative to this prior art.

SUMMARY OF THE INVENTION

This object is achieved by the present invention in that the indicating device integrated in the apparatus has an image projector.

In the case of such an active indicating system, integrated in the apparatus, in the form of an image projector, use simply is made of a flat reflecting region as indicating surface; for example, a piece of paper or a table. The advantage lies in the fact that such a passive indicating surface can be made available virtually anywhere. The indicating surface can be substantially larger in this case than the surface of the apparatus. That is, the apparatus can have an indicating surface the size of a laptop, for example, whereas the apparatus itself is substantially smaller than a laptop. No sort of stationary external indicator, such as an external display screen or similar, is used in this case. Thus, there also is no need to supply energy for a relatively large display screen. The indicating surface can be constructed again and again in simplified fashion and need not be carried around.

The image projector preferably has a light source for generating the light beam, and a motion device that varies the light beam direction as a function of a control signal. The light beam can be moved in the X and Y directions over the indicating surface in this way. The brightness of the light beam is varied by driving the light source appropriately, for example, via pulse-width modulation. The inertia of the human eye gives rise to the impression of a planar image when the light beam is moved, and the brightness varies, at sufficient speed.

The motion device can be configured in this case such that the light source itself is moved, and thus the light beam direction is varied. However, there is preferably a deflecting device which deflects the light beam as a function of the control signal.

This deflecting device preferably has a mirror, it being possible for the deflecting device in the X direction and the deflecting device in the Y direction to be constructed separately. That is to say, the beam is, for example, deflected first at a mirror system in the X direction and reflected onto a mirror that ensures a deflection in the Y direction. It is also possible, however, for there to be a mirror that can be tilted in two directions.

There are various possibilities for achieving the speeds of light beam deflection that are required to generate an image.

In a particularly preferred exemplary embodiment, one of the deflecting devices has a number of mirrors that are arranged one behind another on the circumference of a solid of revolution mounted in a fashion capable of rotation about its axis of symmetry. This is suggested, for example, in order to move the light beam very quickly in one direction in a linewise fashion over the indicating surface and to jump back to the starting point again at the end of the indicating surface for the respective line. Such a deflecting device with a quickly rotating solid of revolution can be used for the purpose of saving space at the same time as a vibration device; for example, by quickly changing the direction of rotation of the solid of revolution.

A further preferred embodiment is a deflecting device having a chip with an integrated deflecting element. This can be a type of movable mirror on a semiconductor chip.

Furthermore, the image projecting device preferably has optical elements (for example, lenses, concave mirrors, etc.) for forming the light beam and/or the beam region which can be detected by the beam. Such an optical element is preferably seated just upstream of the output of the light beam from the housing of the apparatus, in order to widen the beam region such that a satisfactorily large region on the indicating surface is detected.

The light source is preferably a semiconductor laser, since this is relatively small and generates a light beam of small divergence. In principle, however, it also can be a light source with a light emitting diode or similar.

It is also possible for the apparatus to have a number of light sources that generate light beams of different colors, for example. When use is made of light sources having the three primary colors of red, green and blue, any desired color can be generated by appropriate mixing, and so even color images can be displayed with good quality in this way.

Very many components of the image projector can be produced, or consist of, non-conducting material; for example, lenses made from plastic or glass. In addition, the light beam must cover a certain distance inside the apparatus in order to achieve in the deflecting directions, even with small angles of deflection, a sufficiently large deflecting distance on the indicating surface. Consequently, for reasons of saving space, it is suggested to use for the image projector spatial regions in which no optically conductive parts, or only optically conductive parts that are small by comparison with the volume of the relevant regions, may be located, as in the case, for example, with the antenna volume of a mobile radio telephone. Consequently, the light beam is guided through the antenna regions in the case of apparatuses that have an antenna, at least parts of the image projector continuing to be located inside the antenna region of the apparatus.

In the case of the first exemplary embodiment, the apparatus has an integrated antenna with two metal surfaces. At least parts of the image projector are arranged here between the two metal surfaces. These parts can be, for example, a diverging lens or a relatively small mirror whose aluminized surface as conducting part is very small as against the overall volume of the antenna. Furthermore, the light source itself also can be arranged in the antenna volume, since the largest part of such a light source can be fabricated, with the exception of the semiconductor laserchip, from nonconducting material.

In an alternative preferred exemplary embodiment, the apparatus has a hollow rod antenna. In this case, some parts of the image projector, for example a diverging lens and a convex mirror, are arranged in the interior of the rod antenna.

The apparatus further has a stand with the aid of which the apparatus can be set up on a surface such that an exit point of the light beam from the housing or from the antenna of the apparatus is arranged in the prescribed position above the surface. Such a stand ensures that the apparatus stands at rest on the table in order to generate a clear image.

It is, furthermore, advantageous when the apparatus also has a second indicating device in the form of a conventional display integrated in the apparatus. This display can be used alternatively when no more use is made of the table surface at rest; for example, when the apparatus is used when underway, when driving a car, when walking or the like.

Additional features and advantages of the present invention are described in, and will be apparent from, the following Detailed Description of the Invention and the Figures.

BRIEF DESCRIPTION OF THE FIGURES

FIG. 1 shows a schematic lateral longitudinal section through a mobile telephone with an image projector according to the present invention, in accordance with a first exemplary embodiment.

FIG. 2 shows a schematic section from above through a mobile telephone in accordance with FIG. 1.

FIG. 3 shows a schematic lateral longitudinal section through a mobile telephone with an integrated antenna with an image projector according to the present invention, in accordance with a second exemplary embodiment.

FIG. 4 shows a schematic section from above through a mobile telephone as in FIG. 3, but with a light source situated outside the antenna region.

DETAILED DESCRIPTION OF THE INVENTION

Figure 5:
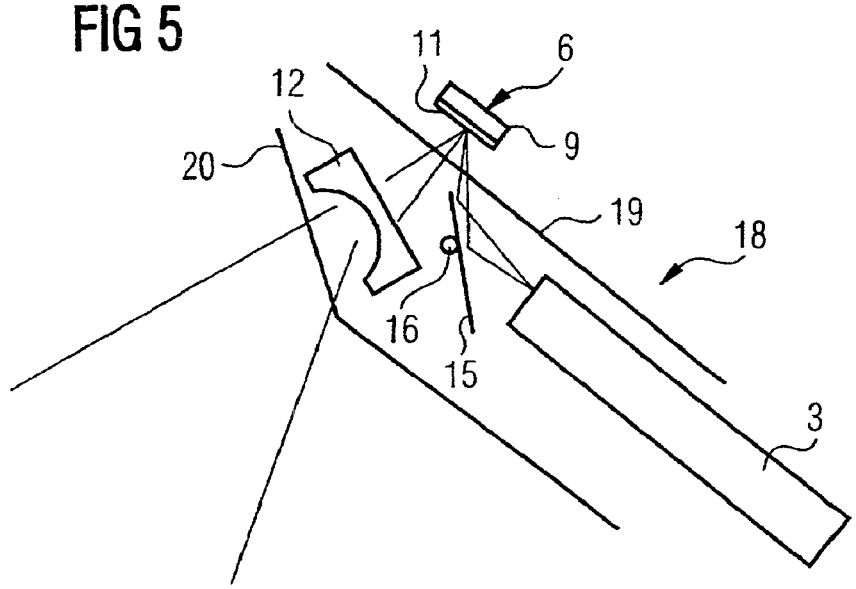
FIG. 5 shows an enlarged illustration of the antenna region of the apparatus from FIG. 3.

The present invention is illustrated in FIGS. 1–6 with the aid, in each case, of a mobile telephone 1; the apparatus in accordance with FIGS. 1 and 2 being a mobile telephone 1 with a rod antenna 17, and the apparatuses in accordance with FIGS. 3 and 4 being mobile telephones 1 with an integrated antenna 18 with two metal surfaces 19, 20.

Only the relevant parts of the antenna 17, 18 and of the image projecting device, as well as the housing 10 of the mobile telephones 1 are illustrated in each case here. Of course, these telephones 1 have all the usual features of a mobile telephone such as keypad, display, interfaces and the usual electronic components located in the mobile telephone.

Figure 6:
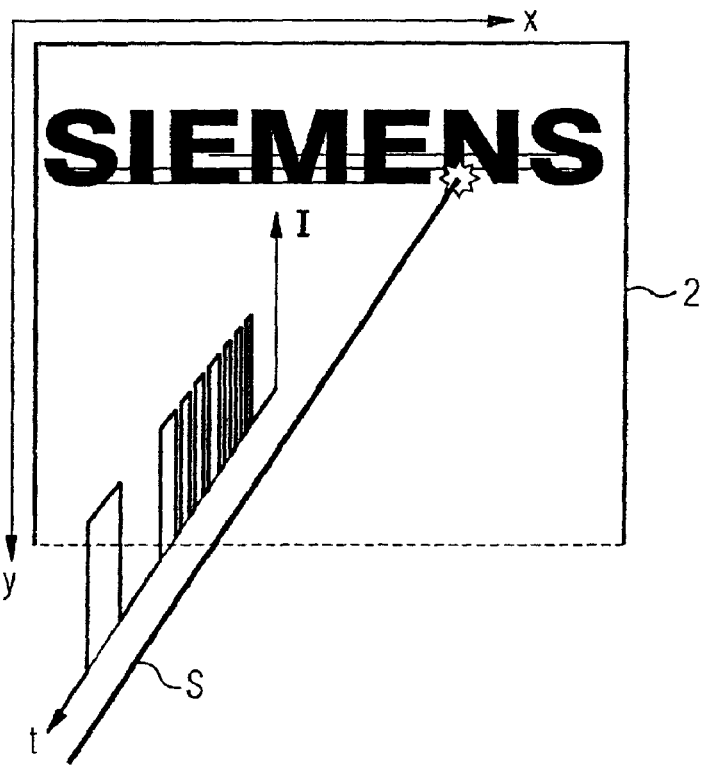
FIG. 6 shows a schematic illustration of the generation of an image on the indicating surface.

In the case of all the apparatuses 1 illustrated in the exemplary embodiments, the image is generated, in each case, on the indicating surface 2, such as on a flat table surface 24, using the principle explained in FIG. 6. In this case, a light beam is moved, with its brightness being varied, very quickly in the X and Y directions over the indicating surface 2. The X direction corresponds in this case to a movement inside an image row, and the Y direction to a movement inside a column. Given sufficient speed, the impression of a planar image arises due to the inertia of the human eye.

As shown by the graph illustrated next to the beam S in FIG. 6, the effective brightness of the light beam S is controlled by pulse width modulation. That is to say, as a function of time t either a light beam S with full intensity I is generated, or the light beam S is blocked out completely.

The light beam S should have as small a divergence as possible in this case. In the exemplary embodiment illustrated, the light beam S is, therefore, generated via a light source 3 with a semiconductor laser.

In the first exemplary embodiment in accordance with FIGS. 1 and 2, the light source 3 is located in the lower part, opposite the antenna 17, of the housing 10 of the mobile telephone 1.

Starting from this light source 3, the light beam S is directed onto a deflecting device 4 that reflects the beam S very quickly in the X-direction, that is to say within a line, and jumps back again at the end of the line to the start of a line. For this purpose, the X reflecting device 4 is constructed in the form of an octagonal solid of revolution 7 whose eight lateral surfaces are provided with mirrors 8. With one revolution of the solid of revolution 7 about the axis of rotation, the respective mirror 8 is tilted, resulting in a deflection of the beam in the X direction. Once the end of the respective mirror 8 is reached, the light beam automatically strikes the following mirror 8, as a result of which the beam jumps again immediately to the start of a line.

By a further mirror 14, the light beam S is then guided onto a Y deflecting device 5 with a tilting mirror. This Y deflecting device 5 is synchronized with the X deflecting device 4 such that when there is a change from one mirror 8 to a following mirror the Y deflecting device 5 is always adjusted such that the light beam S is displaced downward by one line on the indicating surface 2. When the last line is reached, the mirror of the Y deflecting device 5 is tilted back again automatically into the initial position.

Starting from the Y deflecting device 5, the light beam S is guided into a hollow rod antenna 17 in which there is located a plastic diverging lens 12 that expands the beam region. The beam S then falls at the end of the antenna 17 onto a convex mirror 13 that expands the beam region once more to the final size required for the indicating surface 2. The convex mirror 13 then reflects the light beam S through an exit opening (not illustrated in the figures) from the underside of the antenna 17 onto the table surface 24. The exit opening is provided with a window.

In order to save space, the X deflecting device 4 is also simultaneously used with the solid of revolution 7 as vibration alarm unit by virtue of the fact that the solid of revolution 7 is set in rotation, the direction of rotation being changed periodically very quickly.

Located on the underside of the housing 10 of the mobile telephone 1 is a stand 33 that can be folded out and with which the telephone 1 is positioned on the table surface 24. As such, the exit opening in the antenna 17 is arranged at a prescribed position above the table surface 24 in which a sufficiently sharp image of the described size is generated on the table surface 24.

In the case of the second exemplary embodiment in accordance with FIG. 3, the mobile telephone 1 has an integrated antenna 18 with two metal surfaces 19, 20 arranged one above the other. Here, as well, a light source 3 with a semiconductor laser is used again in order to generate the light beam S. The light source 3 is located here partly in the antenna volume; that is, between the metal surfaces 19, 20. This is possible since a majority of the light source 3 consists of non-conducting material. Only the semiconductor laser itself has metal parts. However, these are so small that they have no disturbing effect in the antenna volume.

The exemplary embodiment in accordance with FIG. 4 is a telephone 1 that is identical to the exemplary embodiment in accordance with FIG. 3. However, the light source 3 is accommodated in the lower part of the housing 10 outside the antenna volume.

The beam path with the individual components of the deflecting device in accordance with FIGS. 3 and 4 is illustrated in a magnified fashion in FIG. 5. The light beam S falls here initially onto a mirror 15. This mirror 15 is also located in the antenna volume. It is fixed here via a holder 16. The holder 16 and the largest part of the mirror 15 are made from nonconducting material. Only the reflecting surface of the mirror 15 consists of a metal. However, this is likewise a component which is so small that it has no kind of interfering effect at all in the overall antenna volume.

Starting from the mirror 15, the light beam is guided through an opening 21 in the upper metal surface 19 of the antenna 18 onto a deflecting device 6 located outside the antenna volume. This deflecting device 6 is a semiconductor chip 9 with a reflecting surface 11. The semiconductor chip 9 is located on a printed circuit board, which is not illustrated but is usually located in any case at this position in mobile telephones, on which the remaining electronic components of the mobile telephone 1 are also located. The reflecting surface 11 of this chip 9 can be varied in two directions such that the deflecting device 6 can simultaneously deflect in the X and Y directions. However, it also can be deflected here only in one direction, the deflection in the second direction being performed, for example, by a movement of the light source 3 itself.

The deflecting device 6 reflects the beam back through the opening 21 in the metal plate 19 onto a diverging lens 12, located inside the antenna volume, made from plastic or glass, which expands the beam region to the dimension required. Starting from the lens 12, the beam S then passes out of the antenna volume through an exit opening 22 located in the lower metal surface 20. Through an opening in the housing 10 of the mobile telephone 1 that is provided with a window and is not illustrated in FIGS. 3 and 4, the light beam S is then cast outward onto the table surface 24.

This telephone 1 in accordance with FIGS. 3 and 4 also has a stand 23 with the aid of which the telephone is appropriately positioned over the table surface 24.

In addition to the image projector according to the present invention, in the exemplary embodiments described the mobile telephones 1 have a conventional display (not illustrated in the figures). The information can be indicated as usual on this display.

In this case, an indication simultaneously can be produced by the image projector on a table surface and on the integrated display. However, it is also possible to choose to use only the integrated display or the image projector via appropriate keys and/or with the aid of appropriate functions that can be activated and deactivated via a menu control. Of course, it is also possible for different images to be illustrated on the integrated display and by the image projector. Thus, for example, the menu for controlling the apparatus could be illustrated on the integrated display and, at the same time, the image transmitted by the interlocutor could be illustrated by the image projector in the case of a video phone.

Many components that are used to control the conventional display also can be used, in principle, for controlling the image projector. All that is necessary is to have available an appropriate interface that diverts the control signals sent from the driver to the display into the control signals for the deflecting device and for the light source.

Although the present invention has been described with reference to specific embodiments, those of skill in the art will recognize that changes may be made thereto without departing from the spirit and scope of the invention as set forth in the hereafter appended claims.

What is claimed is:

1. A small-scale apparatus for at least one of communication and data processing, comprising:
   an indicating device integrated in the apparatus, the indicating device having an image projector, and the image projector having both a light source for generating a light beam and a motion device for varying a direction of the light beam as a function of a control signal; and
   an antenna, wherein the light beam traverses an antenna region inside the apparatus.

2. A small scale apparatus as claimed in claim 1, wherein the motion device includes a deflecting device for deflecting the light beam as a function of the control signal.

3. A small scale apparatus as claimed in claim 2, wherein the deflecting device includes a mirror.

4. A small scale apparatus as claimed in claim 2, wherein the deflecting device includes a plurality of mirrors arranged one behind another on a circumference of a solid of revolution mounted in a fashion capable of rotation about its axis of symmetry.

5. A small scale apparatus as claimed in claim 4, wherein the apparatus executes vibratory motions upon a fast periodic change in a direction of rotation of the solid of revolution.

6. A small scale apparatus as claimed in claim 2, wherein the deflecting device includes a chip with an integrated deflecting element.

7. A small scale apparatus as claimed in claim 1, further comprising an optical element for forming at least one of the light beam and a beam range.

8. A small scale apparatus as claimed in claim 1, wherein the light source includes a semiconductor laser.

9. A small scale apparatus as claimed in claim 1, wherein the light source includes a light-emitting diode.

10. A small scale apparatus as claimed in claim 1, wherein the image projector includes a plurality of light sources for generating light beams of different colors.

11. A small scale apparatus as claimed in claim 1, wherein at least parts of the image projector are arranged inside the antenna region of the apparatus.

12. A small scale apparatus as claimed in claim 11, wherein the antenna is an integrated antenna with two metal surfaces, and at least parts of the image projector are arranged between the metal surfaces.

13. A small scale apparatus as claimed in claim 12, wherein at least one of the metal surfaces includes a passage opening for the light beam.

14. A small scale apparatus as claimed in claim 11, wherein the antenna is a rod antenna, and at least parts of the image projector are arranged in an inner space of the rod antenna.

15. A small scale apparatus as claimed in claim 14, wherein the rod antenna includes a passage opening for the light beam.

16. A small scale apparatus as claimed in claim 11, wherein the parts of the image projector that are arranged in the antenna region are substantially nonconducting.

17. A small scale apparatus as claimed in claim 11, wherein conducting components, arranged in the antenna region, of the image projector have a small spatial extent in relation to an antenna volume.

18. A small scale apparatus as claimed in claim 1, further comprising a stand for setting up the apparatus on a surface such that at least one of an exit point for the light beam from a housing and the antenna of the apparatus is arranged at a prescribed position above the surface.

19. A small scale apparatus as claimed in claim 1, further comprising a second indicating device with a display integrated in the apparatus.

* * * * *